(No Model.)

H. E. GAMBLE.
THILL COUPLING.

No. 288,992. Patented Nov. 27, 1883.

Witnesses,

Inventor.
Henry E. Gamble,
per Gridley & Co
his Attorneys.

UNITED STATES PATENT OFFICE.

HENRY E. GAMBLE, OF EVANSTON, ILLINOIS, ASSIGNOR OF ONE-HALF TO OSCAR H. MANN, OF SAME PLACE.

THILL-COUPLING.

SPECIFICATION forming part of Letters Patent No. 288,992, dated November 27, 1883.

Application filed May 7, 1883. (No model.)

*To all whom it may concern:*

Be it known that I, HENRY E. GAMBLE, of Evanston, in the county of Cook and State of Illinois, have invented certain new and useful Improvements in Thill and Pole Couplings; and I do hereby declare that the following specification, taken in connection with the accompanying drawings, is a full, clear, and exact description thereof.

Figure 1:
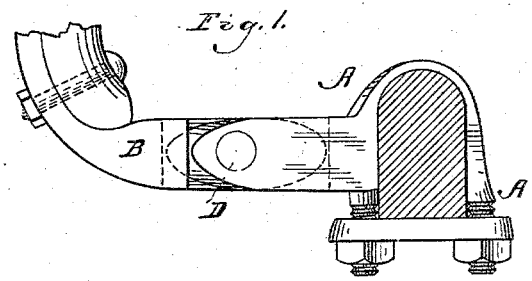
Figure 2:
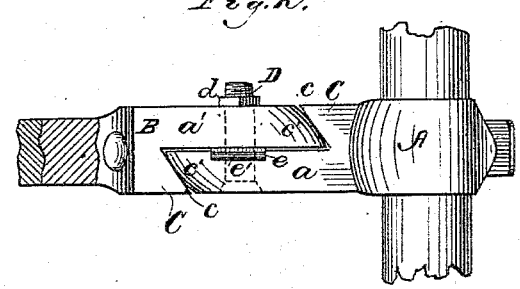
Figure 3:
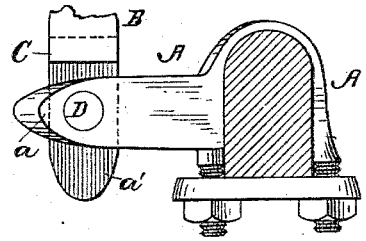
Figure 4:
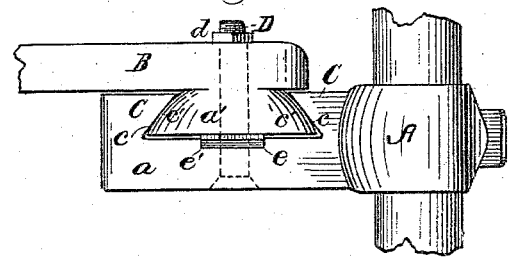

Figure 1 represents a side view of a thill and pole coupling embodying my improvements; Fig. 2, a top view of the same; Fig. 3, a side view of the coupling when in position to attach or detach the shafts or pole to or from the vehicle; and Fig. 4 represents a top view of a modified form of construction of said coupling.

Like letters of reference indicate like parts.

My invention consists of a novel construction of a thill and pole coupling, whereby provision is made for the quick and easy connection and disconnection of the shafts or pole of the vehicle, without any unscrewing or removal of bolts or pins, as hereinafter more fully described and claimed.

The coupling is composed of two pieces; A, the clip-iron, which is attached to the axle of the vehicle in the usual manner, and B the thill or pole iron, which is attached to the shafts or pole in any known manner. The projecting parts $a$ $a'$ of the clip and thill irons are made of corresponding form and dimensions, the ends $a'$ of which are correspondingly beveled and rounded on their outer surfaces, as shown. At or near the base of each clip and thill iron is formed a short projecting lug or stop, C, having a beveled or inclined inner surface, $c$, so as to receive the beveled ends of the projecting parts $a$ $a'$, respectively.

To the clip-iron A is attached, in any suitable manner, a pin or pivot, D, which projects laterally therefrom, and through a corresponding perforation, $d$, in the thill-iron B, and beyond the outer side of the thill-iron. The pin D in the clip-iron and the perforation $d$ in the thill-iron are so arranged that when the thills are attached to the clips, as shown in Fig. 3, and the thills rotated or moved into position upon the pivot or pin D, as shown in Fig. 2, the beveled and rounded ends of the clip and thill irons will come in frictional contact with the beveled or inclined surfaces $c$ of the stops C, respectively.

To compensate for wear of the frictional surfaces, and to prevent rattling, I make a countersink, $e$, in the clip-iron, about the base of the pin D, and pass over the pin and fit within the countersink a washer, $e'$, of rubber or metal, or both combined, or of spring metal of sufficient thickness or bend to project beyond the inner surface of the clip-iron.

To attach the thills or pole to the vehicle, place the thills or pole in such position that the pins on the clip-irons A (one of which pins should be made longer than the other, so that it will engage one of the thill or pole irons before the other) will enter the perforations in the thill or pole irons; then raise the thills, and at the same time press them toward the stops or lugs of the clip-irons until the beveled parts clear each other; then lower the thills or pole, when the beveled surfaces coming in contact will press the thill or pole irons to their places, and at the same time compress the washers, which force the thill or pole irons in frictional contact with the clip-irons, and thereby prevent rattling.

Having thus described my invention, what I claim as new, and desire to secure by Letters Patent, is—

1. The combination of the clip-iron A, having the beveled or inclined surfaces $c$ and $c'$, and provided with the pin or pivot D, with the thill or pole iron B, having correspondingly beveled or inclined surfaces, and perforation $d$, substantially as and for the purposes specified.

2. A thill-coupling consisting of the clip-iron A, having the outer surface of its projecting part $a$ beveled or inclined, the beveled stop C, and the pin or pivot D, the thill or pole iron B, having a corresponding projecting part, $a'$, and beveled stop C, and provided with the perforation $d$, the countersink $e$, and washer $e'$, substantially as shown and described.

HENRY E. GAMBLE.

Witnesses:
 N. COWLES,
 J. S. THOMPSON.